United States Patent [19]
Hergott et al.

[11] Patent Number: 6,066,035
[45] Date of Patent: May 23, 2000

[54] AUTOMATIC CONTROL FOR TERMINATING THE FILLING OF A SAUSAGE CASING, AND METHOD OF USE THEREOF

[75] Inventors: Steven P. Hergott, West Des Moines; Michael S. Simpson, Norwalk, both of Iowa

[73] Assignee: Townsend Engineering Company, Des Moines, Iowa

[21] Appl. No.: 08/960,308

[22] Filed: Oct. 29, 1997

[51] Int. Cl.[7] .................................................. A22C 11/00
[52] U.S. Cl. .................................................. 452/31; 452/47
[58] Field of Search .................. 452/31, 35, 47

[56] References Cited

U.S. PATENT DOCUMENTS

| | | | |
|---|---|---|---|
| 3,545,038 | 12/1970 | Myles et al. | 452/31 |
| 4,257,146 | 3/1981 | Karp | 452/31 |
| 4,370,779 | 2/1983 | Meier | 452/47 |
| 4,563,792 | 1/1986 | Niedecker | 452/31 |
| 4,602,402 | 7/1986 | Schnell | 452/31 |
| 4,970,758 | 11/1990 | Naples et al. | 452/38 |
| 5,147,239 | 9/1992 | Staudenrausch | 452/47 |
| 5,480,346 | 1/1996 | Kasai et al. | 452/47 |
| 5,743,792 | 4/1998 | Hanten et al. | 452/31 |

*Primary Examiner*—Willis Little
*Attorney, Agent, or Firm*—Zarley, McKee, Thomte, Voorhees & Sease

[57] ABSTRACT

An automatic control for terminating the filling of a sausage casing on a sausage casing machine has a sensor on the machine to detect when the rearward end of a telescopic casing is closely adjacent the discharge end of a meat stuffing tube. The sensor is connected to the meat emulsion pump for stopping the pump under such conditions. A timer or pulse counter is associated with the computer on the machine to "measure" when the rearward end of the casing substantially reaches the discharge end of the stuffing tube. The timer or counter is operatively connected to the power system for rendering the machine inoperative after a predetermined amount of time or pulses. The sensor and timer are connected to the above stated respective components through a computer so that the computer can automatically compensate for the operating time of the second cycle to accommodate for speed changes imposed on the power system in the second cycle. The method involves locating the sensor at the above designated positions to permit the sensor to shut down the pump and to trigger the timer to subsequently shut down the machine automatically.

6 Claims, 1 Drawing Sheet

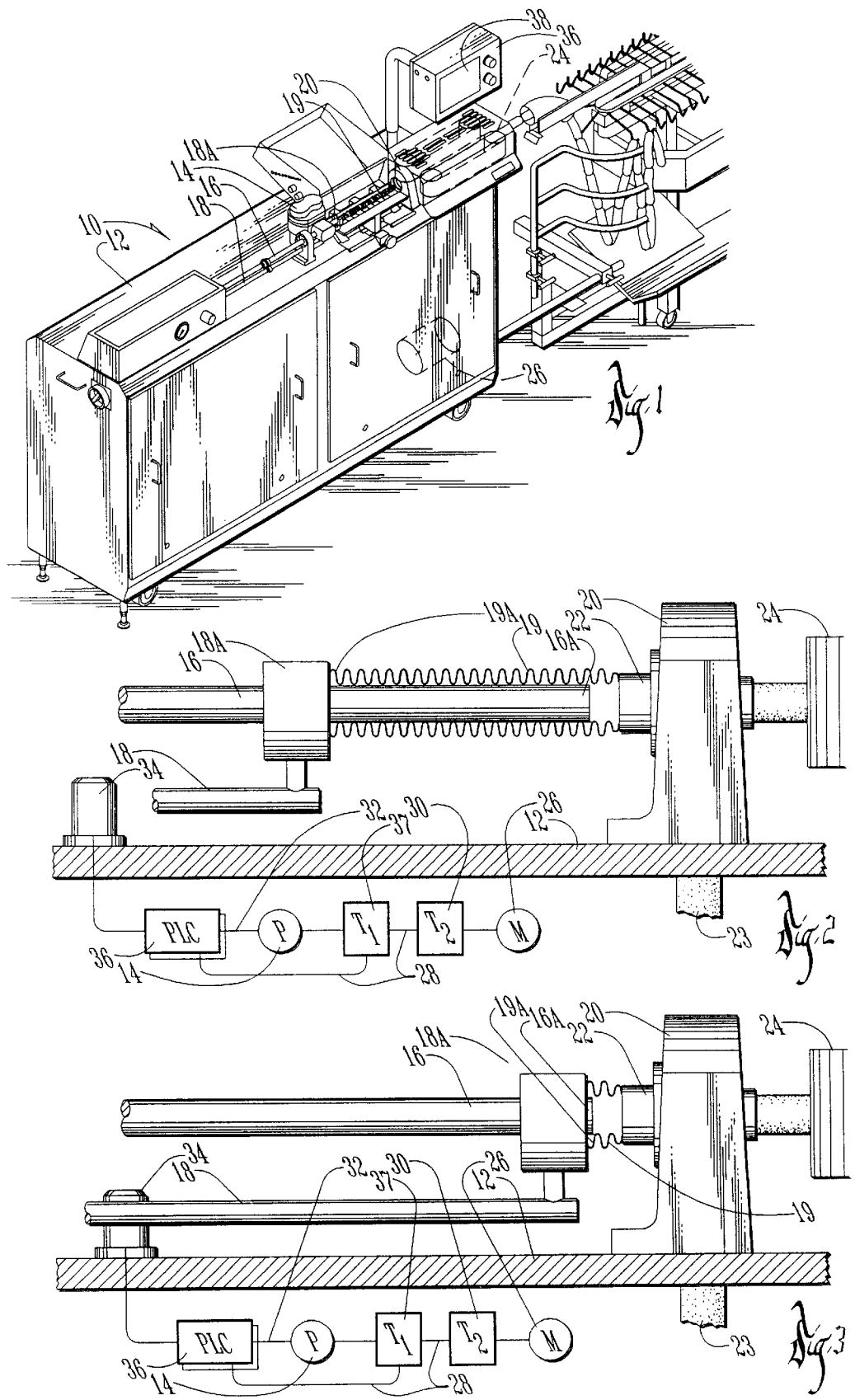

AUTOMATIC CONTROL FOR TERMINATING THE FILLING OF A SAUSAGE CASING, AND METHOD OF USE THEREOF

BACKGROUND OF THE INVENTION

On conventional sausage making machines, meat emulsion is extruded through and out of a stuffing tube into a shirred casing that is mounted on the exterior of the tube. While the shirred casing is perhaps only 16 inches in length, it is capable of encasing a strand of sausage perhaps 100 feet or so long.

When the casing is substantially filled with sausage, and the rearward end of the casing approaches the discharge end of the tube, the meat pump and the machine need to be stopped in a timely manner so as not to extrude meat emulsion after the shirred casing is fully removed from the outside of the stuffing tube.

In addition, if sausage specification changes are made between the filling of one casing and another, care must be exercised that the machine can adapt to create an appropriate tail length of casing under the new conditions.

Conventional machines are not well adapted to accommodate either of the foregoing problems.

It is therefore a principal object of this invention to provide an automatic control for terminating the filling of a sausage casing, and the method of use thereof, where the meat emulsion pump can be timely shut off as the rearward end of the casing approaches the discharge end of the tube, and that the entire machine be shut down as the end of the filled casing "coasts" to the discharge end of the looper horn.

Specifically, a further object of this invention is to permit automatic adjustment of such time by a computer without the need for immediate operator adjustment of the components of the machine.

These and other objects will be apparent to those skilled in the art.

SUMMARY OF THE INVENTION

An automatic control for terminating the filling of a sausage casing on a sausage casing machine has a sensor on the machine to detect when the rearward end of a telescopic casing is closely adjacent the discharge end of a meat stuffing tube. The sensor is fixed on the follower. The sensor triggers a timer or pulse counter which stops the pump after a short time lapse. The timer or pulse counter is associated with the computer on the machine to "measure" when the rearward end of the casing substantially reaches the discharge end of the stuffing tube. The timer is also operatively connected to the power system for rendering the machine inoperative after a predetermined amount of time or pulses. The sensor and timer are operatively connected to the above stated respective components through a computer so that the computer can automatically compensate for the operating time of the second cycle (the filling of the next casing) to accommodate for speed changes or the like imposed on the power system in the second cycle. The method involves properly locating the sensor to permit the sensor to start the counter or pulse counter to shut down the pump and to trigger another timer to subsequently shut down the machine automatically to leave a "tail" or empty casing segment of appropriate length to tie off the filled casing.

BRIEF DESCRIPTION OF THE DRAWINGS

FIG. 1 is a perspective view of a sausage making machine;

FIG. 2 is a schematic diagram showing the point in operation of the machine wherein the sensor and first timer are activated; and FIG. 3 is a view similar to that of FIG. 2 but shows the arrangement of the parts when the second timer will stop the machine.

DESCRIPTION OF THE PREFERRED EMBODIMENT

A conventional sausage making machine 10 is shown in FIG. 1. Machine 10 has a frame 12 upon which is mounted a meat emulsion pump 14 which in turn is connected to a source of meat emulsion (not shown). Pump 14 is operatively connected to stuffing tube 16. A conventional follower 18 is also mounted on frame 12 parallel to tube 16. A conventional power means, such as a piston or the like (not shown) moves between an extended position and a retracted position so as to slide the tube 16 and to push by member 18A thereon a shirred casing 19 towards the discharge end 16A of stuffing tube 16.

Machine 10 has a conventional twister housing 20 which rotatably supports a hollow chuck 22 which is adapted to rotate within housing 20 by means of a suitable power means such as belt 23. A conventional linker 24 is mounted on the frame downstream from twister housing 20 to receive a meat emulsion casing 19 for linking the same to create a plurality of links in the sausage strand.

The motor 26 is conventionally connected to various moving parts of the machine 10, such as belt 23 to permit the machine to accomplish its various functions. The motor 26 is connected to timer 30 by means of line 28. Similarly, pump 14, including its power mechanism (not shown) is connected to sensor 34 by means of line 32. A computer 36 and timer 37 are operatively imposed in lines 28 and 32. This arrangement allows the computer 36 to operatively coordinate in a varied manner the functional relationship between the computer 36, the timer 30 and motor 26, and between sensor 34, computer 36, timer 37 and pump 14.

It should be noted that the sensor 34 is triggered when the follower 18 is in the position of FIG. 2. In that position, the rearward end 19A of the shirred casing is closely adjacent the discharge end 16A of stuffing tube 16. FIGS. 2 and 3 are not drawn to scale for the longitudinal distance between follower element 18A and the end 19A of casing 19 may be as small as ⅜ of an inch.

It should also be noted that the timer 37 is triggered by sensor 34 at the position of FIG. 2 to start counting so as to be able to stop the pump 14 when the rearward end 19A of the shirred casing is at the position of FIG. 3. This period is usually only a few tenths of a second. The pump 14 is then shut down and timer 30 starts to cause the rearmost empty segment of casing 19 to clear the machine and leave an unfilled casing tail of sufficient length to permit the filled downstream casing to be manually tied off.

If the speed of the machine is increased between the use of one shirred casing 19 and a subsequent shirred casing 19, the computer is programmed to automatically accommodate for this speed increase so that the time that it takes the follower to move from the position in FIG. 2 to the position of FIG. 3 is about the same for both cycles. When the new speed of the machine is punched into the screen control 38 of computer 36, the computer makes all necessary adjustments in machine components for the next cycle to achieve the pump and machine shut downs, and leave a suitable casing tail for the casing filled under the changed specification.

It should be understood that the specification for each type of sausage are imposed on the memory of computer 36. The operator merely punches the screen control 38 for the desired specification, and the computer 36 then instructs sensor 34 and timers 30 and 37 to perform their tasks to terminate the casing filling operation to shut off the pump and the machine in a timely sequence to leave the desired tail without wasting either meat emulsion or casing material.

The use of sensor 34, timer 30 and 37, and the computer 36 in the manner described substantially reduces wastage of meat emulsion and eliminates the wastage of footage of the casing 19 at the fractional seconds before the casing 19 is completely filled with meat emulsion. This invention also achieves substantial economies in both time and material. It is therefore seen that this invention will achieve at least all of its stated objectives.

What is claimed is:

1. A machine for making encased sausages having a frame, a meat emulsion pump, a stuffing tube connected to the pump for extruding meat emulsion through a discharge end thereof, a tubular casing having a rearward end, a follower movably mounted adjacent the stuffing tube for pushing said casing forwardly on the stuffing tube for receiving meat emulsion from the discharge end thereof, a power means for driving the pump, a power means for driving components of the machine, including a linker and a looper horn, the improvement comprising, a sensor on the machine to detect when the rearward end of the casing is closely adjacent the discharge end of said stuffing tube, and being operatively connected to the pump for stopping the pump under such conditions, and a timer on the machine operatively connected to the power means for rendering the machine inoperative when the rearward end of said casing substantially reaches the discharge end of said looper horn.

2. The machine of claim 1 wherein said sensor and said timer are connected to a computer which in turn is connected to said pump and said power means to permit the activation of said sensor and the rendering of the machine to an inoperative condition to be automatically appropriate even though sausage specification changes are imposed on said machine between the time that one casing is filled and another casing is readied to be filled.

3. A method of automatically sequentially rendering inoperative the pump and machine components of a machine for making encased sausages having a frame, a meat emulsion pump, a stuffing tube connected to the pump for extruding meat emulsion through a discharge end thereof, a tubular casing having a rearward end, a follower movably mounted adjacent the stuffing tube for pushing said casing forwardly on the stuffing tube for receiving meat emulsion from the discharge end thereof, a power means for driving the pump, a power means for driving components of the machine, including a linker and a looper horn, the improvement comprising, providing a sensor on the machine to detect when the rearward end of the casing is closely adjacent the discharge end of said stuffing tube, triggering a timer means for operatively stopping the pump under such conditions, after a short interval of time; and rendering the machine inoperative after a second interval of time when the rearward end of said the casing substantially reaches the discharge end of said looper horn.

4. The method of claim 3 comprising the following step: connecting said sensor and said timer to a computer to permit the aforesaid events to take place sequentially.

5. The method of claim 3 wherein a casing tail of unfilled casing material is left when said machine is rendered inoperative.

6. The method of claim 4 varying specifications for making encased sausages are imposed on a memory means of said computer so that an operator can selectively actuate said computer to manufacture sausages according to one of said specifications whereupon said computer will automatically process the aforesaid events sequentially according to the chosen specifications.

\* \* \* \* \*